(12) United States Patent
Argoitia et al.

(10) Patent No.: US 10,329,429 B2
(45) Date of Patent: Jun. 25, 2019

(54) MICROSTRUCTURED DEVICE WITH EMBOSSED LAYER

(75) Inventors: Alberto Argoitia, Santa Rosa, CA (US); Lily O'Boyle, Cream Ridge, NJ (US); Cornelis Jan Delst, Fairfax, CA (US); Laurence Holden, Cranbury, NJ (US)

(73) Assignee: VIAVI Solutions Inc., San Jose, CA (US)

( * ) Notice: Subject to any disclaimer, the term of this patent is extended or adjusted under 35 U.S.C. 154(b) by 145 days.

(21) Appl. No.: 13/198,540

(22) Filed: Aug. 4, 2011

(65) Prior Publication Data

US 2013/0034707 A1 Feb. 7, 2013

(51) Int. Cl.
*C09C 1/00* (2006.01)
*G03H 1/02* (2006.01)
*G03H 1/00* (2006.01)

(52) U.S. Cl.
CPC .......... *C09C 1/0015* (2013.01); *G03H 1/0244* (2013.01); *G03H 1/0272* (2013.01); *C09C 2210/30* (2013.01); *C09C 2210/40* (2013.01); *G03H 1/0011* (2013.01); *G03H 1/028* (2013.01); *G03H 2270/24* (2013.01); *Y10T 428/24851* (2015.01)

(58) Field of Classification Search
USPC ....................................................... 428/161
See application file for complete search history.

(56) References Cited

U.S. PATENT DOCUMENTS

| | | | |
|---|---|---|---|
| 4,705,300 A | 11/1987 | Berning et al. | 283/91 |
| 5,624,076 A * | 4/1997 | Miekka | B22F 1/0007 164/46 |
| 6,235,105 B1 * | 5/2001 | Hubbard et al. | 106/415 |
| 6,383,638 B1 | 5/2002 | Coulter et al. | 428/403 |
| 6,468,380 B1 * | 10/2002 | Christuk et al. | 156/244.16 |
| 7,085,058 B2 * | 8/2006 | Heim | G03H 1/02 359/2 |
| 7,258,915 B2 | 8/2007 | Argoitia et al. | 428/323 |

(Continued)

FOREIGN PATENT DOCUMENTS

EP 2042576 A1 * 4/2009
JP 11080585 3/1999

(Continued)

OTHER PUBLICATIONS

Glass Transition Temperature via wikipedia, https://en.wikipedia.org/wiki/Glass_transition, 12 pages.*

(Continued)

*Primary Examiner* — Gerard Higgins
(74) *Attorney, Agent, or Firm* — Harrity & Harrity, LLP (57) ABSTRACT

A security device has a support substrate of a first material having a softening temperature t1 and an embossed layer of a second different material supported by the support substrate having a softening temperature t2, wherein t2<t1.

A thin film coating deposited directly upon the embossed layer, wherein the embossed layer is capable of being dissolved in a dissolving agent and wherein the thin film coating is not dissolvable by said dissolving agent. There is not need for an additional release layer as the second different material is dissolvable and allows flakes to be formed by dissolving the second layer.

20 Claims, 5 Drawing Sheets

(56) References Cited

U.S. PATENT DOCUMENTS 7,645,510 B2   1/2010   Argoitia ............... 428/402

FOREIGN PATENT DOCUMENTS

| WO | 03053674 | 7/2003 |
| WO | 2004044059 | 5/2004 |

OTHER PUBLICATIONS

Tech Tip 23_Tg Glass Transition Temperature for Expoxies_www.epotek.com/site/files/Techtips/pdfs/tip23.pdf, 2 pages.*

Poly(ethylene terephthalate) information and properties, http://www.polymerprocessing.com/polymers/PET.html.*

Pohanish, Richard P.. (2012). Sittig's Handbook of Toxic and Hazardous Chemicals and Carcinogens (6th Edition)—Acetone. Elsevier. Online version available at: http://app.knovel.com/hotlink/pdf/id:kt0094L8T5/sittigs-handbook-toxic-3/acetone.*

The Corrosion Society, (2002), Corrosion Survey Database (COR•SUR). NACE International. Online version available at: http://app.knovel.com/hotlink/toc/id:kpCSDCORSE/corrosion-survey-database/corrosion-survey-database.*

Celnax, Nissan Chemical Industries LTF., Performance Materials, Inorganic Materials, http://www.nissanchem.co.jp/eng/products/materials/cell_nacs.html.*

SunColloid AMT—130S, Pulp and Paper Online, http://www.pulpandpaperonline.com/doc/suncolloid-amt-103s-0001.*

Pohanish, Richard P.. (2008). Sittig's Handbook of Toxic and Hazardous Chemicals and Carcinogens (5th Edition)—Acetone. William Andrew Publishing. Online version available at: http://app.knovel.com/hotlink/pdf/id:kt006NACU1/sittigs-handbook-toxic/acetone.*

Polymer Processing, Polymethyl methacrylate properties http://polymerprocessing.com/polymers/PMMA.html via Internet Wayback Machine, Apr. 2, 2010; http://web.archive.org/web/20100402124417/http://polymerprocessing.com/polymers/PMMA.html; combined document 5 pgs.*

EP Search Report from corresponding EP application No. 12178949.

* cited by examiner

Checkerboard height and width

| Sample | Area | Height (nm) 1 | 2 | Hill width (nm) | Valley width |
|---|---|---|---|---|---|
| 295°F/ 60 PSI/ 45fpm | Left | 293 | 270 | 7.5 | 8.2 |
| 295°F/ 60 PSI/ 45fpm | Center | 356 | 306 | 7.7 | 8.2 |
| 295°F/ 60 PSI/ 45fpm | Right | 290 | 279 | 7.5 | 8.2 |
| 305°F/ 60 PSI/ 60fpm | Left | 275 | 360 | 7.6 | 8.2 |
| 305°F/ 60 PSI/ 60fpm | Center | 241 | 217 | 7.6 | 8.3 |
| 305°F/ 60 PSI/ 60fpm | Right | 269 | 343 | 7.7 | 8.3 |
| 315°F/ 50 PSI/ 50fpm | Left | 316 | 217 | 7.6 | 8.3 |
| 315°F/ 50 PSI/ 50fpm | Center | 402 | 279 | 7.5 | 8.4 |
| 315°F/ 50 PSI/ 50fpm | Right | 284 | 410 | 7.6 | 8.3 |

Figure 2c

Figure 3  Pigments obtained with the checkerboard foil

MICROSTRUCTURED DEVICE WITH EMBOSSED LAYER

FIELD OF THE INVENTION

This invention relates generally to a device having a microstructure such as a hologram, grating, grooves, alphanumeric symbol or other indicia formed therein and to the manufacture of thin film flakes having such microstructure.

BACKGROUND OF THE INVENTION

Thin film flakes such as color-shifting flakes have been manufactured for decades using what is now a standard process. A supporting web or substrate, typically polyester terephthalate (PET) is coated with a thin film optical coating having a desired optical effect. However, before applying the thin film optical coating to the PET a very thin release layer of soluble organic or inorganic material such as NaCl, wax, silicon or other suitable material is applied to the PET that allows the thin film optical coating coated thereover to be removed from the PET supporting layer. Generally the thin film coating is released from the PET by passing it through a stripper containing solvent such as acetone or in some instances water, then over rollers and in a chamber containing solvent. In order to lessen the amount of solvent required to dissolve the release layer, and to reduce materials that have to be used in this process, it is desired to have the release layer be as thin as possible. In practice, the thickness of the release layer is many orders of magnitude thinner than the substrate it is coated on.

In the process of manufacturing thin film interference optical flakes the thin film optical coating is often applied by coating an absorber layer on top of the thin release layer in a vacuum chamber and subsequently coating a dielectric spacer layer over the absorber layer and then coating a reflective layer over the dielectric spacer layer.

This process is described by Roger Phillips in U.S. Pat. No. 4,705,300, by Coulter et al. in U.S. Pat. No. 6,383,638 and by Argoitia in U.S. Pat. No. 7,258,915 all of which are incorporated herein by reference, for all purposes.

U.S. Pat. No. 6,235,105 in the name of Hubbard discloses multilayer thin film materials produced by pre-coating a carrier substrate with a soluble release coating and depositing thin films of the optical materials in preselected sequence onto the carrier to build up the desired multilayer thin film structure, similar to the steps described above. Hubbard also discloses that alternatively, the substrate itself may be soluble. After deposition of the multilayer structure, the release coat (or the substrate) is dissolved, thereby freeing the multilayer structure from the substrate so that the same can be broken up into small flakes.

In the past number of years, there has been increased interest in providing thin film flakes that have indicia stamped therein. Flakes with Euro symbols or specialized symbols have been used on numerous documents and tokens requiring security features to verify authenticity. For example, casino tokens have been coated with thin film coatings that include flakes with particular stamped indicia.

U.S. Pat. No. 7,645,510 in the name of Argoitia discloses flakes having grooved frames and symbols thereon.

The process of stamping or embossing an embossable coated layer is disclosed U.S. Pat. No. 6,468,380 in the name of Miekka et al. incorporated herein by reference. Miekka et al. describe in detail a method of embossing a coated sheet with a microstructure in the form of a diffraction or holographic pattern. Miekka, in a similar manner as embossed thermoplastic layers are used today, utilizes a substrate of heat resistant polyethylene terephthalate (PET) base layer. The heat resistant PET is typically coated with a thermoplastic coating such as polyvinylchloride. An embossing pattern in holographic form can be formed on the thermoplastic layer which desirably contains a release agent such as hydroxylated polysiloxane which allows separation of the embossing from the embossing roller.

Miekka further teaches as a first step of fabricating a grating or hologram, the provision of a heat resistant plastic film with a thermoplastic coating that has a softening temperature below the heat-distortion temperature of the heat resistant film. The thermoplastic is then heated to above its softening temperature and the softened thermoplastic layer is contacted with an embossing master. The contacting step involves the contact of the thermoplastic layer with an embossing master, which is an embossing roller, a metallic die, or a metalized plastic film, on the roller. The master can be used to form a holographic or diffractive pattern in the thermoplastic layer. The thermoplastic surface is heated to above its softening temperature; and the softened thermoplastic surface is contacted with an embossing master at temperatures below the thermoplastic softening temperature of the coating so that rapid embossing takes place and reflow of the plastic is avoided after separation of the coating.

As of late, in an attempt to fabricate multilayer flakes with a predetermined pattern or microstructure thereon or therein, a separate thin release layer is coated over top of the embossed thermoplastic layer.

The thin release layer can be NaCl, $Na_2B_4O_7$ hydrated (Borax) or another type of release layer is coated upon the stamped material which is subsequently coated in a vacuum chamber. Since the NaCl and borax are soluble in water, the coated product is then placed into a container of water and the coating is removed.

In some instances we have found that release layers such as NaCl or borax, left on the coating are harmful to one or more layers, for example to the absorber layer on color shifting flakes. Furthermore, it is desirous not to provide this thin release layer as its application includes an additional production step in manufacturing and extra materials being used.

The typical process for producing thin-film flakes having microstructures therein has been to provide a substrate with a high softening temperature, coated or laminated with an embossing material having a lower softening temperature, then stamping the embossing material under suitable heat and pressure so as to form an embossing, and subsequently coating the embossed material with the thin release layer (NaCl or Borax) described above, followed by coating the release layer with the thin film coating. The next step involves submersing the coated structure in a bath of water and wiping the structure so as to release the flakes.

In an effort to lessen the steps and materials used, and to produce a superior product this invention provides a solution that eliminates the addition of a release layer over the stamped embossed layer.

It is a further object of this invention to fabricate thin film flakes having a microstructure therein, wherein the flakes are absent unwanted residue often associated with release layers such as NaCl or borax.

It is an object of this invention to provide a method of fabricating flakes wherein a dissolvable coated microstructure obviates the use of a very thin standard release layer.

SUMMARY OF THE INVENTION

In accordance with the invention there is provided a security device comprising:

a support substrate of a first material having a softening temperature t1;

an embossed layer of a second different material supported by the support substrate having a softening temperature t2, wherein t2<t1;

a thin film coating deposited directly upon the embossed layer, wherein the embossed layer is capable of being dissolved in a dissolving agent and wherein the thin film coating is not dissolvable by said dissolving agent.

In accordance with the invention a security device is provided, comprising:

a first substrate layer having a softening temperature t1;

a second layer having a microstructure embossed therein, wherein the second layer is supported by and is in direct contact with the substrate and wherein the second layer has a softening temperature 12, wherein t2<t1, wherein the second layer is a dissolvable layer that can be dissolved by a dissolving agent and wherein layer has a first thickness Th1 in cross-section in some regions and second thickness Th2 in other embossed regions, wherein Th2<Th1; and, an optical coating including one or more layers coated directly upon the second layer, wherein at least one layer of the optical coating substantially conforms to the microstructure upon which it is coated, and wherein the optical coating provides an optical effect to light incident thereon, and wherein the optical coating is resistant to dissolving by the dissolving agent.

In accordance with another aspect of the invention a method of forming embossed thin film optical flakes is provided comprising:

providing a first substrate layer having a softening temperature t1 having a second layer having a thickness of at least 300 nm thereon;

embossing the second layer having a softening temperature t2 so as to form a microstructure embossed therein, wherein t2<t1;

in the absence of a release layer over the embossed second layer, coating a surface of the second layer directly with a thin film coating so that at least a layer of the thin film coating conforms to the microstructure formed in the second layer;

dissolving the second layer with a dissolving agent so as to release the thin film coating from the second layer so as to form flakes, wherein the dissolving agent and is selected such that the optical coating is resistant to dissolving by the dissolving agent.

BRIEF DESCRIPTION OF THE DRAWINGS

Exemplary embodiments of the invention will be described in conjunction with the figures in which:

FIG. 2a is a plan view obtained by Atomic Force Microscopy of a portion of a stamped sheet of DUN-TRAN™ stamped in a checkerboard pattern;

FIG. 2b is an isometric view of the stamped sheet of FIG. 2a;

DETAILED DESCRIPTION

In an effort to reduce processing steps and materials involved in fabricating embossed thin film flakes we attempted to emboss a material that we thought would be useful as an embossed base layer that could be coated in a vacuum chamber with thin film layers and serve as a support. Unfortunately, if a material is soft enough to be embossed so as to replicate a form in a stamping shim, we found that it did not work well as a stand-alone substrate and was not suitable in a roll-to-roll embossing process. Using a harder material with a higher glass transition temperature posed problems with replication. Furthermore, it was our goal not to use a thin release layer such as NaCl between a stamped layer and the coating layer or layers. This invention provides a security structure coated with one or more thin film layers that can be submerged in a bath of a solvent to provide microstructured thin film flakes directly from the deposited thin film layers. The flakes may be single layered flakes or can be multilayer microstructured flakes such as color shifting flakes useful in security applications wherein covert features are encoded into the flakes by way of an embossing of a carrier upon which the flake material is coated. Unlike prior art methods of producing such flakes, a thin release layer is not required between the coating layer and the embossed supporting layer. In fact in a novel process, the embossed layer itself becomes the release layer, as it is dissolvable in a solvent which does not dissolve the thin film coating. The embossing layer would have to provide acceptable embossing characteristics, replicate the stamp within embossing shim accurately, have a softening temperature that was less than the supporting substrate; and be dissolvable in a solvent that would not dissolve the thin film coating or negatively affect the coating.

The invention described in detail hereafter provides a solution wherein a two layered structure formed of two different materials provides a composite web consisting of a supporting layer and an embossed layer that is subsequently coated in a deposition chamber and wherein the embossed layer itself is dissolved after the coating is applied, thereby releasing the coated material from the web without a thin release layer required over the embossed layer as was practiced in the prior art.

Figure 1:
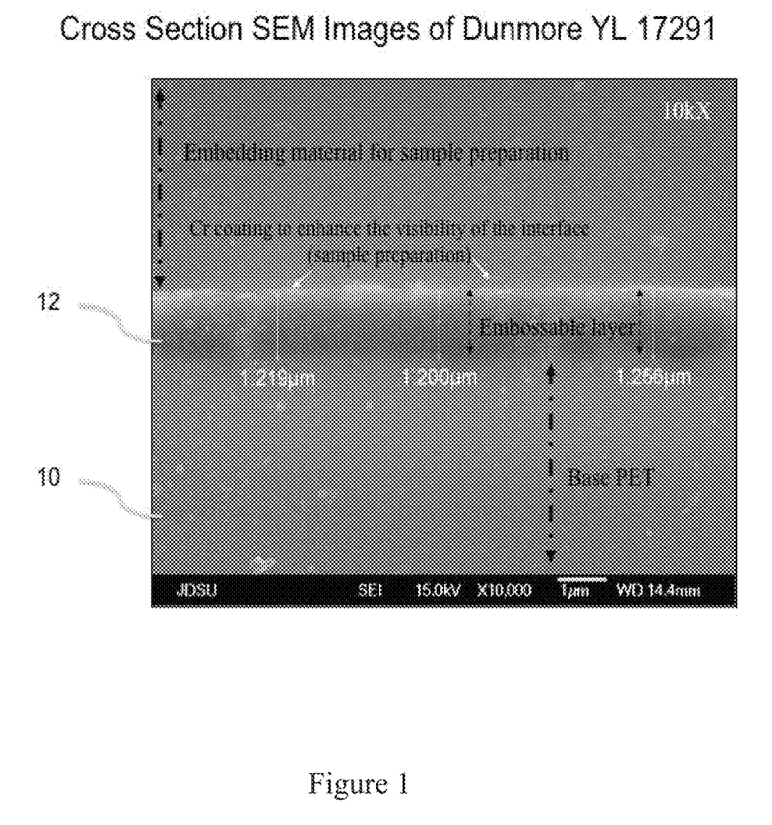
FIG. 1 is a SEM micrograph of a cross section of a foil sample of Dunmore DUN-TRAN™, which has a base of PET with an embossable layer thereover and having a special layer of Cr coating for the purposes of enhancing the visibility of the interface applied for the purpose of increasing the contrast of portions of the SEM image.
Figure 5A:
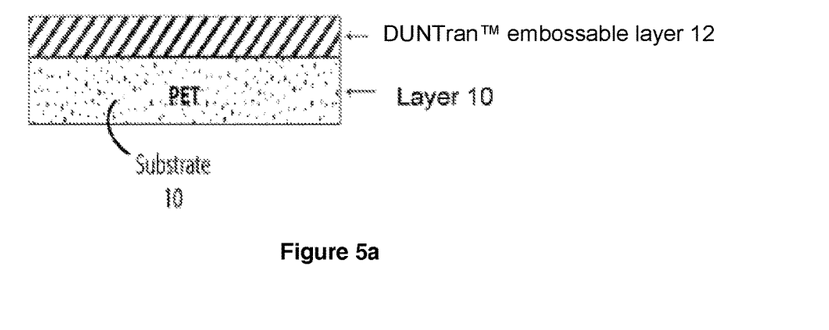
FIG. 5a is a cross-sectional view of a prior art DUN-TRAN™ film.
Figure 5B:
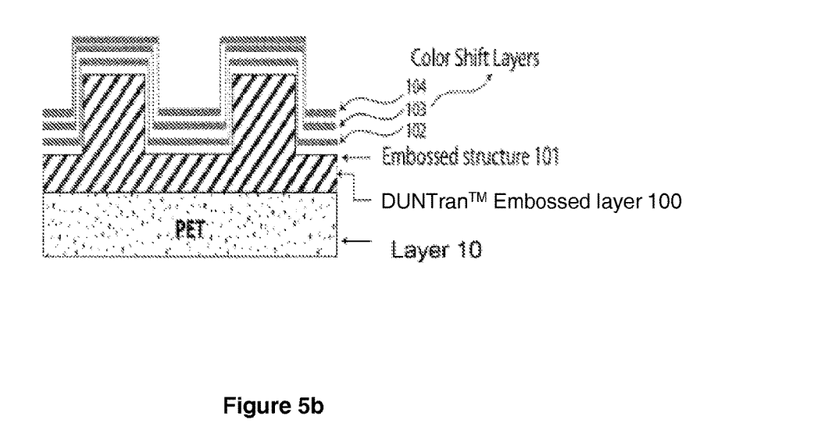
FIG. 5b is a special DUN-TRAN™ film made with a thicker top embossing layer shown embossed and coated with three layers forming a color shift coating.

Turning now to FIGS. 1 and 5 a first embodiment of the invention is shown, wherein a substrate 10 of a first material such as PET has a layer 12 of a second material thereover that is has a softening temperature less than a softening temperature of the PET substrate 10. It is preferable that the embossable layer has a softening temperature Tg that is at least 10 degrees Celsius lower than the associated softening temperature of the substrate. The purpose of the substrate 10 is to provide a firm backing when the second more malleable material lower softening temperature material is stamped and deformed under heat and pressure to follow the imprint of the shim impressed therein. In addition the substrate 10 provides enough rigidity for use in a roll-to-roll coating process.

In experiments we performed we tested several stamping materials and achieved our best results using DUN-TRAN™ transfer film produced by the Dunmore Corporation, hereafter referred to as DUN-TRAN™.

DUN-TRAN™ is advertised as a surfacing film to turn leathers and fabrics into gold, silver, bronze, pewter and other metallic colors and provide a wet-rub abrasion resistant coating to withstand the rigors of fabrication in shoes handbags and other articles.

We have discovered that DUN-TRAN™ consists of a support substrate of a first material having a softening temperature t1, having thereon and contacting an embossable layer of a second different material supported by the support substrate having a softening temperature t2, wherein t2<t1. According to US Patent Application No. 20090117373, the support substrate in Dun-Tran films may be siliconized so as to provide a release coating.

Figures 2A, 2B:
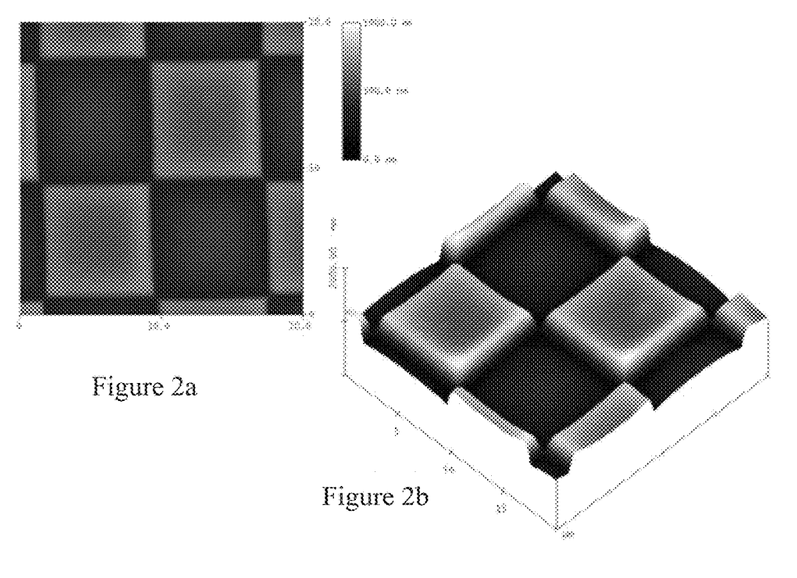
Figure 2C:
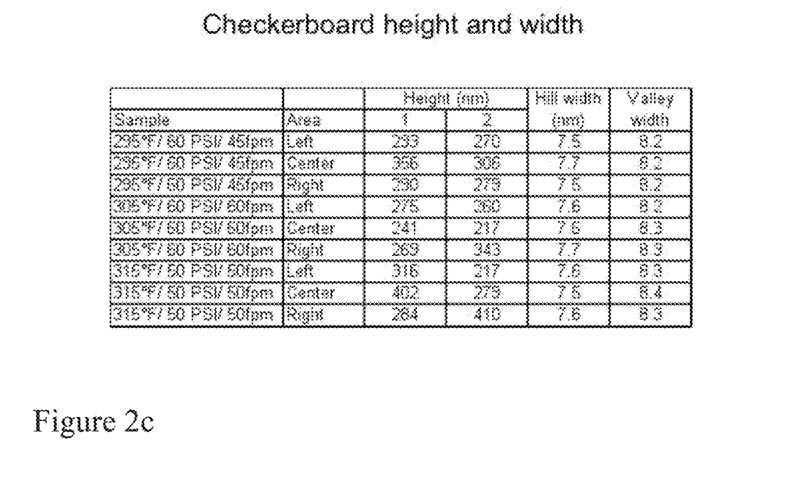
FIG. 2c is a chart showing varying height, hill width and valley width of the sample of FIG. 2b.
Figure 3:
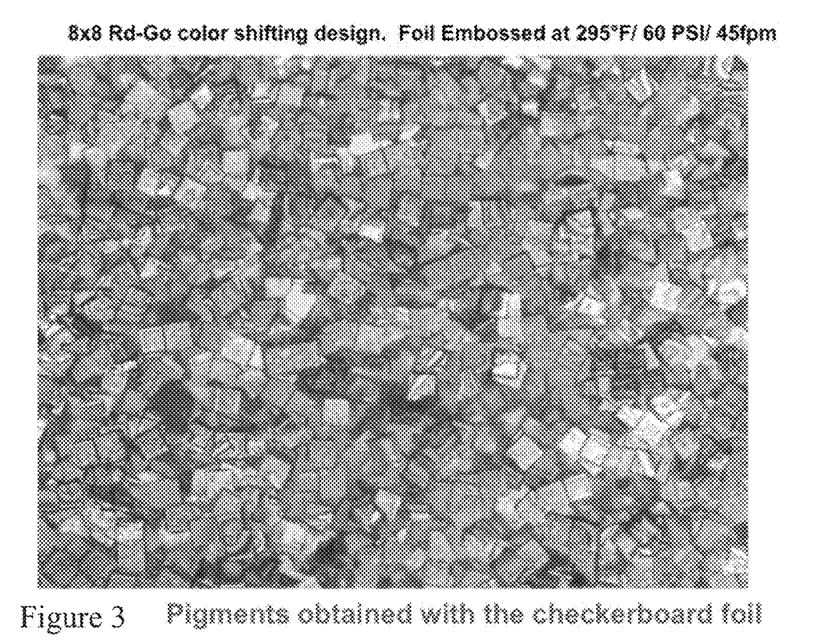
FIG. 3 is a black and white photo of the pigments obtained with the stamped foil obtained from the stamped sheet of DUN-TRAN™ shown in FIGS. 2a and 2b.
Figure 4:
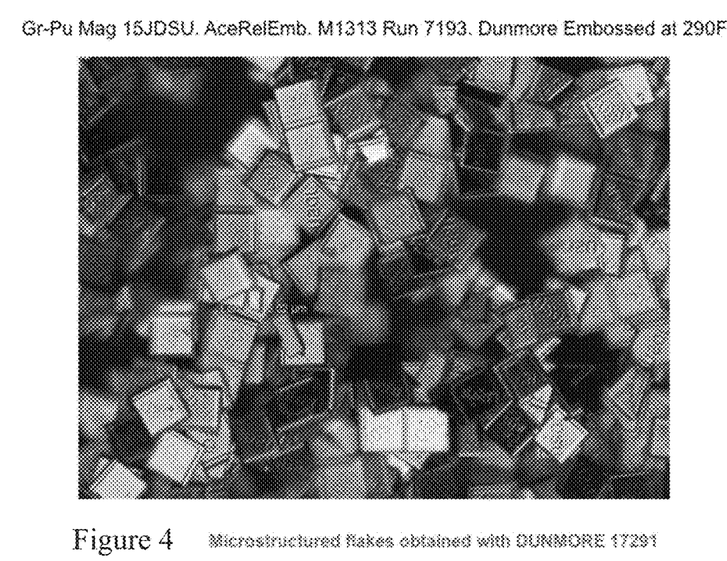
FIG. 4 is shows stamped color shifting flakes made in accordance with this invention by embossing DUN-TRAN™ film with framed squares having the logo JDSU and coating the stamped film with five layers of coating forming a color shifting coating thereon; the flakes shown display different colors at different observation angles.

Referring now to the chart of FIG. 2c temperature, pressure and speed are varied as the roll is moved through the embossing process. The embossing Ni shim has a negative of the desired microstructure disposed rolled around a cylinder upon which the DUN-TRAN™ is rolled and moved under applied pressure and temperature.

Surprisingly, we found DUN-TRAN™ to be excellent for our intended purposes as an embossable supported web for use in our flake making process. Although this film is commercially available having a thickness of 200 nm to 300 nm, for the depth of our stamping shims we requested the fabrication of DUN-TRAN™ transfer film having a thickness of 500 nm to 1500 nm which was sufficient to provide micro structures having a depth of approximately 400 nm. Turning now to FIG. 5b a stamped DUN-TRAN™ film having a PET support layer 12 and an embossed layer 100 is shown together forming an embossed structure 101 wherein layers 102, 103 and 104 form a color shift semi-transparent structure consisting of an Absorber/Dielectric/Absorber formed over the embossed structure 101. The color shift layers include an absorber layer 102, a dielectric layer 103 and an absorber layer 104, wherein the dielectric layer 103 is between the absorber layers. A color shifting design including an opaque reflector, based on five layers (Abs/Diel/Reflector/Diel/Abs) can be also produced when coated over the embossed structure 101. There were several advantages to using DUN-TRAN™. It is capable of excellent replication of a stamping shim's form and can be used with standard temperatures and pressures associated with processes for embossing substrates; and more importantly, it is dissolvable in a solvent. We had excellent results using acetone to dissolve the stamped DUN-TRAN™ rapidly and completely.

When we tested DUN-TRAN the emboss temperatures that provided favorable results were in the range of 280-320° F. with the optimum temperature being 315° F. Acetone was used to fully dissolve the emboss layer and the embossed image was very good with clear replication of the embossing shim. Other materials were tested, for example Crown products such as OX68, XST, OST, OLT however dissolvability was not ideal and in some cases the embossed layer did not completely dissolve in acetone, or separate from the coating. We embossed Toray U6E and the embossed layer was not ideal and the embossed layer did not fully dissolve in acetone. Although these other tested materials were not our preferred materials and did not perform as well as DUN-TRAN, their use may be considered for particular applications where for example complete dissolvability is not required, or where excellent replication is not required.

Of course other materials that have a low enough softening point so as to be stamped so as to replicate a stamped image with excellent reproduction, and which can be coated in a vacuum chamber and dissolved in a solvent, would be useful for this invention. However we believe in all instances, the material used must be a composite material formed of a first support layer having a higher softening temperature than the embossable material supported thereby. In general the glass transition temperature (Tg) of the emboss layer will be between 70 and 200° C.

DUN-TRAN™, which was superior in all of our tests, has the combined property of holding up in the high temp embossing, forming a desired shape and complete dissolvability.

For our specific purposes in particular applications, having acetone release alone is not enough. If the embossed layer is not dissolved adequately, the flake may conglomerate in an ink system from thermoplastic residue. Dissolvability alone will not work either; if the embossing does not have a desirable shape forming ability, the image quality will be poor and flake may break up prematurely. These are all considerations when selecting a suitable material for embossing.

In accordance with this invention Production DUN-TRAN™ film is a two layer film that is coated with coating after the DUN-TRAN™ two layer film is embossed. A first coating layers of one more coating layers are applied directly over layer 100 without any additional release layer required. Standard vacuum coating was used to produce the color shifting coating upon the second layer 100. Conveniently this structure does not require a standard release layer between the microstructured layer and the coating layer. Obviating this standard thin release layer saves on a process step, saves on additional materials, and protects the layers from contact with a NaCl release layer. Heretofore, no one has provided a thick stamped layer having a microstructure embossed therein, having a thickness of at least 500 nm with excellent replication quality for a 400 nm deep surface relief formation wherein that layer is itself dissolvable from the coating upon it.

The embossed layer may have frames embossed therein and/or may have holograms, diffraction gratings and logos. In alternative embodiments the embossed microstructure can have different depths or heights producing flakes with a microstructure having different levels. By way of example a logo may be at a first depth wherein an image about the logo may be embossed deeper than the logo; or text may be at a first depth and other indicia may be at a second different depth. Embossed frames may be deeper than the symbols within a frame, thereby assisting a flake in breakage along the frame but not through the symbol area.

Of course numerous other embodiments may be envisaged without departing from the spirit and scope of the invention.

What is claimed is:

1. A multilayer device comprising:
    a substrate layer comprising a first material having a first softening temperature;
    an embossed layer comprising a second material having a second softening temperature,
        the second softening temperature being less than the first softening temperature,
        the second softening temperature being at least 10 degrees Celsius less than the first softening temperature, and a glass transition temperature of the embossed layer being between 70 and 200 degrees Celsius; and a thin film coating that is deposited directly upon the embossed layer, the thin film coating comprising a first absorber layer, a second absorber layer, and a dielectric layer, the dielectric layer being between the first absorber layer and the second absorber layer, and the embossed layer being capable of being completely dissolved in a dissolving agent while the thin film coating is not dissolvable by the dissolving agent.

2. The multilayer device of claim 1, wherein regions of the embossed layer are at least 500 nm thick.

3. The multilayer device of claim 1, wherein the first material is a polymeric foil.

4. The multilayer device of claim 1, wherein the thin film coating has a plurality of dielectric layers that include the dielectric layer.

5. The multilayer device of claim 1, wherein the thin film coating is a color shifting coating.

6. The multilayer device of claim 1, wherein the embossed layer comprises a plurality of structures that define edges or frames which facilitate breakage for forming flakes.

7. The multilayer device of claim 1, wherein the embossed layer is in contact with the substrate layer.

8. The multilayer device of claim 1, wherein the embossed layer comprises holograms.

9. The multilayer device of claim 1, wherein the embossed layer provides a microstructure having a depth of approximately 400 nm.

10. The multilayer device of claim 1, wherein the thin film coating further comprises a reflector layer.

11. The multilayer device of claim 10, wherein the reflector layer is between the first absorber layer and the second absorber layer.

12. A device comprising:
a first layer comprising a first material having a first softening temperature;
a second layer comprising a second material having a second softening temperature,
the second softening temperature being less than the first softening temperature,
the second softening temperature being at least 10 degrees Celsius less than the first softening temperature,
a glass transition temperature of the second layer being between 70 and 200 degrees Celsius, and the second layer being an embossed layer of having a microstructure; and
a thin film coating that is deposited directly upon the second layer,
the second layer being capable of being completely dissolved in a dissolving agent while the thin film coating is not dissolvable by the dissolving agent.

13. The device of claim 12, wherein the thin film coating is released from the second layer that is dissolved.

14. The device of claim 13, wherein the thin film coating comprises a plurality of dielectric layers.

15. The device of claim 12, wherein the second layer comprises a thickness between 500 nm and 1500 nm.

16. The device of claim 12, wherein the second layer is embossed using a temperature between 280-320 degrees Fahrenheit.

17. The device of claim 12,
wherein the second layer is applied directly over the first layer without any additional layer between the second layer and the first layer,
wherein the first layer is a substrate layer, and
wherein the second layer is the embossed layer.

18. The device of claim 12, wherein the second layer has the microstructure, and wherein the microstructure has a depth of approximately 400 nm.

19. The device of claim 12, wherein the thin film coating comprises a first absorber layer, a second absorber layer, a reflector layer, and a dielectric layer.

20. The device of claim 19, wherein the reflector layer is between the first absorber layer and the second absorber layer.

* * * * *

UNITED STATES PATENT AND TRADEMARK OFFICE
CERTIFICATE OF CORRECTION

PATENT NO. : 10,329,429 B2
APPLICATION NO. : 13/198540
DATED : June 25, 2019
INVENTOR(S) : Alberto Argoitia et al.

Page 1 of 1

It is certified that error appears in the above-identified patent and that said Letters Patent is hereby corrected as shown below:

In the Claims

Claim 12, Column 8, Line 8, "layer being an embossed layer of having a" should be changed to -- layer being an embossed layer or having a, --.

Signed and Sealed this
Ninth Day of June, 2020

Andrei Iancu
*Director of the United States Patent and Trademark Office*